United States Patent [19]

Perrin et al.

[11] Patent Number: 5,417,348

[45] Date of Patent: May 23, 1995

[54] WATER TAP

[75] Inventors: Robert B. Perrin, Hornchurch; Gregory N. Rowe, Dagenham; Peter R. Charters, Reigate; Patrick S. Racz, London, all of Great Britain

[73] Assignee: Avilion Limited, United Kingdom

[21] Appl. No.: 270,228

[22] Filed: Jul. 1, 1994

Related U.S. Application Data

[63] Continuation of Ser. No. 859,382, May 22, 1992, abandoned.

[30] Foreign Application Priority Data

Nov. 21, 1989 [GB] United Kingdom ............... 8926245
Jul. 24, 1990 [GB] United Kingdom ............... 9016216

[51] Int. Cl.$^6$ ............ F16K 11/20; E03C 1/02; E03B 7/07; C02F 9/00
[52] U.S. Cl. ............ 222/129.1; 4/675; 137/801; 137/606; 261/43; 261/65; 261/121.1
[58] Field of Search ............ 222/129.1; 4/675–678; 137/801, 606, 125; 261/43, 65, 121.1, DIG. 7

[56] References Cited

U.S. PATENT DOCUMENTS

| | | | |
|---|---|---|---|
| 1,550,448 | 8/1925 | Newton | 4/676 |
| 1,825,826 | 10/1931 | Schulder | 137/606 |
| 2,235,357 | 3/1941 | Conklin | 261/DIG. 7 X |
| 2,416,581 | 2/1947 | Harr | 137/801 X |
| 2,502,603 | 4/1950 | Tanner | 99/323.2 |
| 2,986,306 | 5/1961 | Cocanour | 222/129.1 |
| 3,757,814 | 9/1973 | Hill | 137/268 |
| 4,077,545 | 3/1978 | Karls | 137/801 X |
| 4,482,509 | 11/1984 | Iannelli | 261/DIG. 7 X |
| 4,518,541 | 5/1985 | Harris | 261/DIG. 7 X |
| 4,597,509 | 7/1986 | Pereira | 261/DIG. 7 X |
| 4,660,740 | 4/1987 | Brandon, Jr. et al. | 261/DIG. 7 X |
| 5,021,250 | 6/1991 | Ferguson | 222/129.1 X |

FOREIGN PATENT DOCUMENTS

| | | | |
|---|---|---|---|
| 1446469 | 6/1966 | France . | |
| 0449005 | 5/1956 | United Kingdom | 4/678 |
| 0836929 | 6/1960 | United Kingdom | 137/801 |
| 0866672 | 4/1961 | United Kingdom | 4/676 |
| 0931705 | 7/1963 | United Kingdom | 137/801 |
| 1034215 | 6/1966 | United Kingdom . | |
| 1326352 | 8/1973 | United Kingdom | 4/678 |
| 2104625 | 3/1983 | United Kingdom . | |
| 2160623 | 12/1985 | United Kingdom | 137/801 |
| 8901361 | 2/1989 | WIPO . | |

*Primary Examiner*—Andres Kashnikow
*Assistant Examiner*—Anthoula Pomrening
*Attorney, Agent, or Firm*—Gardner, Carton & Douglas

[57] ABSTRACT

A mixer tap unit has a body connected to a nozzle having two separate water passages extending the length of the nozzle. A hot water connection, a cold water connection and a filtered water connection are provided for the body. In use, the hot and cold water can mix in a mixing chamber in the tap body and flow along the passage. Filtered water flows separately along the passage. Valves are provided to respectively control the flow of the hot, cold and filtered water. In a preferred form, a chamber allows carbonization of the filtered water prior to delivery to the tap body and the supply of $CO_2$ gas to the chamber is controllable by a valve. The valve is operated in a first direction to inject $CO_2$ gas into water in the chamber, and in a second direction to allow the carbonated water to flow to the nozzle.

12 Claims, 5 Drawing Sheets

WATER TAP

This application is a continuation of application Ser. No. 07/859,382, filed on May 22, 1992, now abandoned.

The invention relates to water taps.

Water taps which provide a common outlet for hot and cold water are well known and are often referred to as "mixer taps". It is a usual requirement that the hot and cold water are not allowed to mix in a manner which allows hot water from say a domestic system to enter the mains cold water supply network, and so mixing is arranged to take place externally of the nozzle. This requires that the nozzle has separate hot and cold passages running along its length. The separate passages can take many forms but are conventionally either semi-circular In cross section and form together an overall circular nozzle or consist of the pipe inside the other.

In addition to normal hot and cold water supplies to various parts of a building, and especially to a sink unit in a domestic kitchen, there is a fairly recent desire to supply purified or filtered water to various points of need. The filtered water is supplied via a separate outlet and separate tap which requires extra plumbing and space. Typically, the water itself is taken from the usual cold water supply and passed through a filter unit which uses replaceable filter cartridges.

One aim of the present invention is to provide a combined tap which can supply hot, cold and filtered water.

According to a first aspect of the invention there is provided a water tap comprising a tap body coupled to a nozzle having an outlet and at least two separate passages extending from the tap body to the nozzle outlet, connections for connecting hot and cold water supplies to the body and a connection for connecting a filtered water supply to the body, and valves for controlling the supply of the hot and cold water and the filtered water to the nozzle passages via the body, the arrangement being such that the filtered water passes through one of the nozzle passages and the hot and cold water pass through the other passage or passages.

Preferably the filtered water valve is a biased lever operated valve so that the valve cannot be left open inadvertently. The valve may be fitted with a return override so that the valve will remain open at least for several seconds after being opened.

In a particularly preferred form the tap body includes a mixing chamber into which both the hot and cold water are fed from the respective valves, the mixed hot and cold water then being fed through a common passage in the nozzle. Non-return valves may be provided in the hot and cold water supply lines upstream of the respective control valves to prevent infiltration of one supply into the other, which is a requirement of some water authority regulations.

With the arrangement according to the first aspect of the invention, the filtered water and untreated hot or cold water are delivered to the nozzle outlet along separate passages, thus there is no contamination of the filtered water. Of course, in normal operation the hot and cold water valves would not be operated at the same time as the filtered water valve.

Another aim of the present invention is to provide a water tap for supplying carbonated water, and in particular carbonated filtered water. This may be supplied as the filtered water in the tap of the first aspect of the invention. In another preferred form, a fourth control valve and water supply connection and, optionally, an additional nozzle passage, may be provided to supply carbonated water separate to the hot and cold water and the filtered water.

In a particularly preferred form filtered water and carbonated filtered water are supplied through the same nozzle passage, the filter water control valve being arranged to operate selectively a system for carbonating the filtered water before it is delivered to the nozzle.

According to a second aspect of the invention there is provided a water tap for the supply of carbonated and uncarbonated water, the water tap comprising a tap body having a nozzle connected thereto for the delivery of water, a chamber connected to the tap body and having a connection for a water supply and a connection for a source of pressurized gas, and control means on the tap body operable to control the supply of gas into the chamber to carbonate water in the chamber, and to control the flow of water from the chamber to the nozzle.

Preferably the control means is in the form of a knob or lever which is operable in first direction to allow gas to pass into the chamber and in a second direction to allow water to pass from the chamber to the nozzle.

Very preferably the chamber is connected to a purified water supply.

The invention will now be described by way of example with reference to the accompanying drawings, in which.

Figure 1:
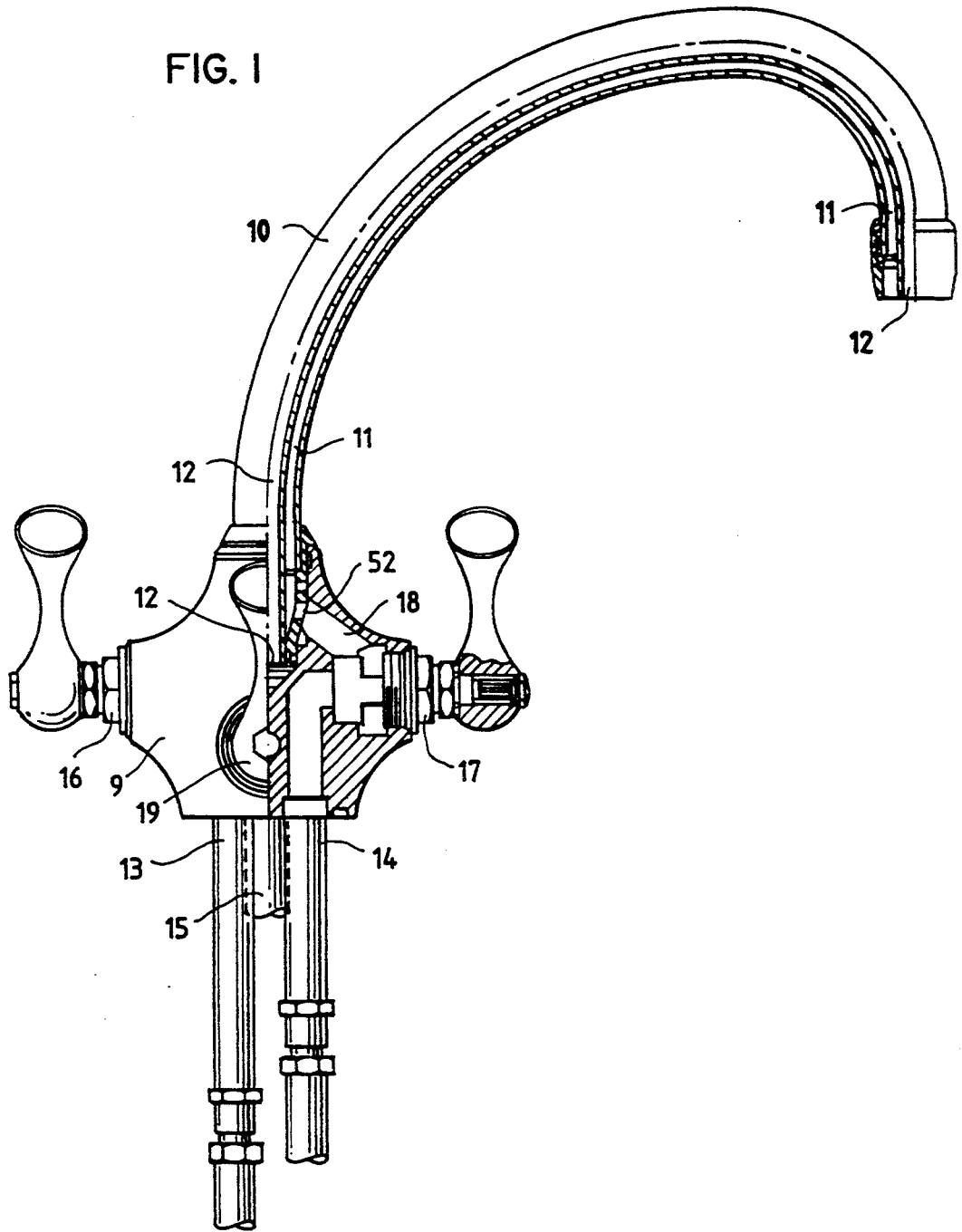
FIG. 1 is a part-sectional front view of a water tap forming a first embodiment of the invention.
Figure 2:
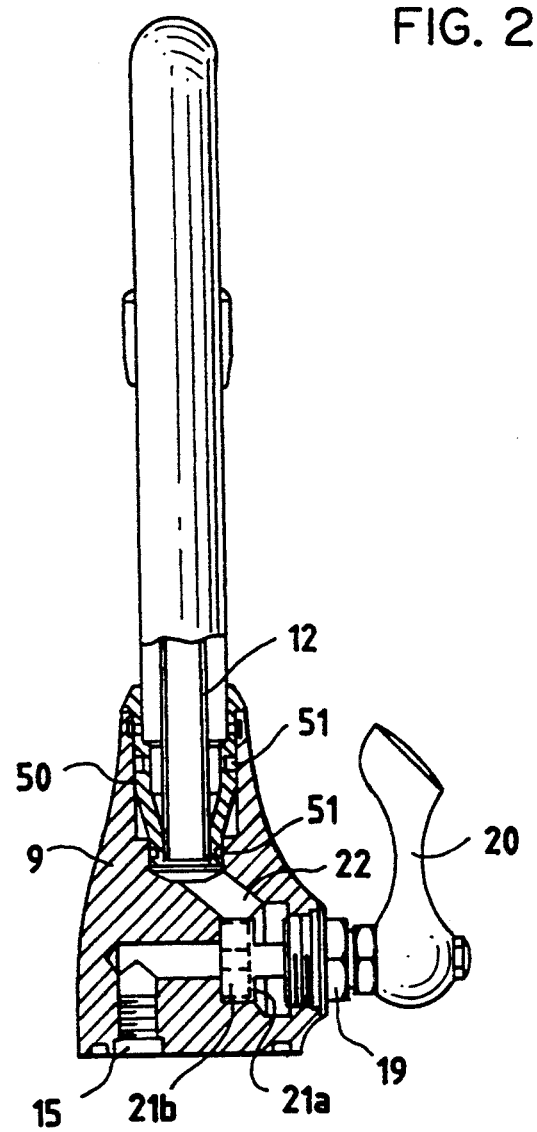
FIG. 2 is a part-sectional side view of the tap of FIG. 1.
Figure 3:
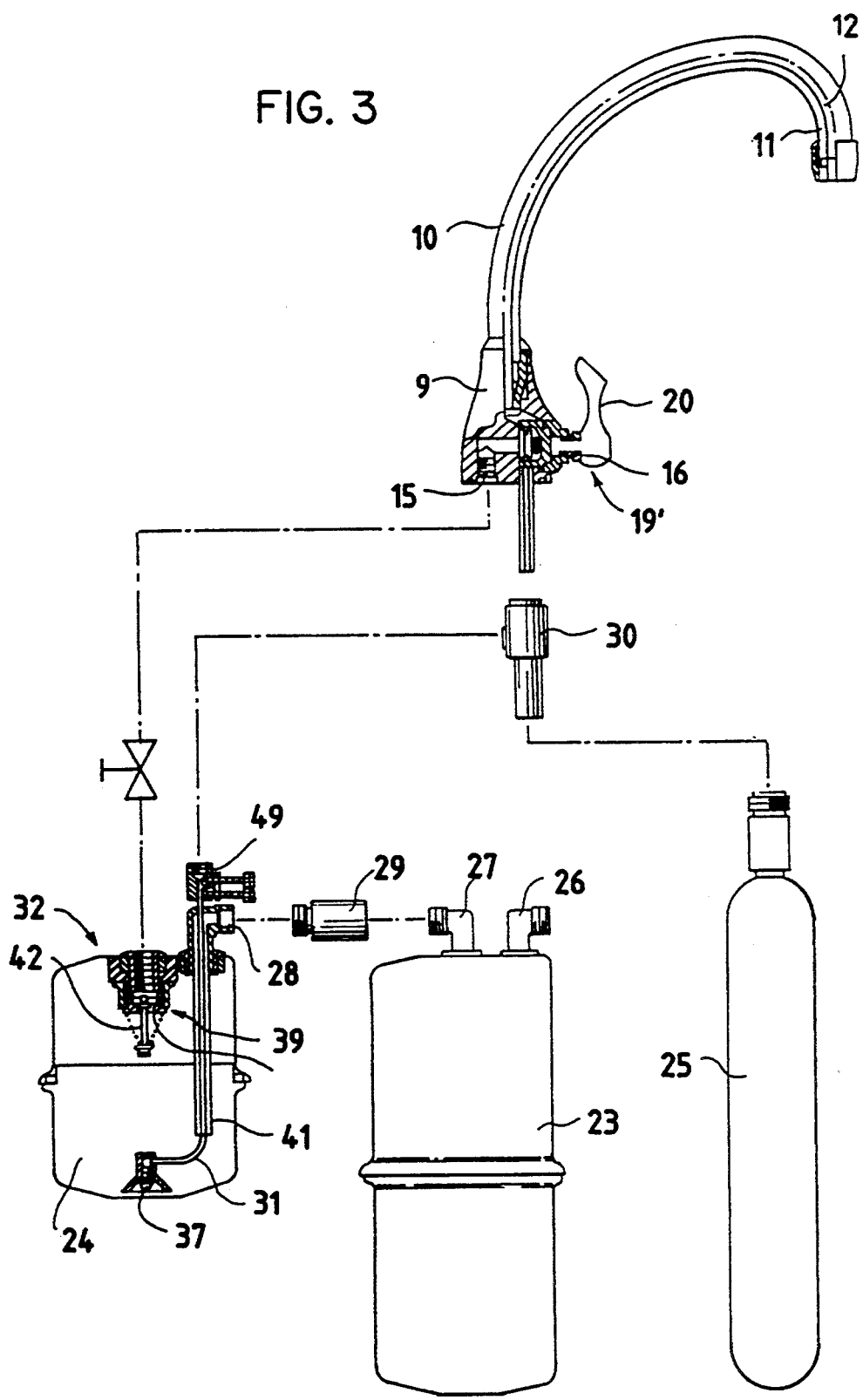
FIG. 3 is a part-sectional general assembly view of a second embodiment of the invention and showing a carbonated, filtered water supply.
Figure 4:
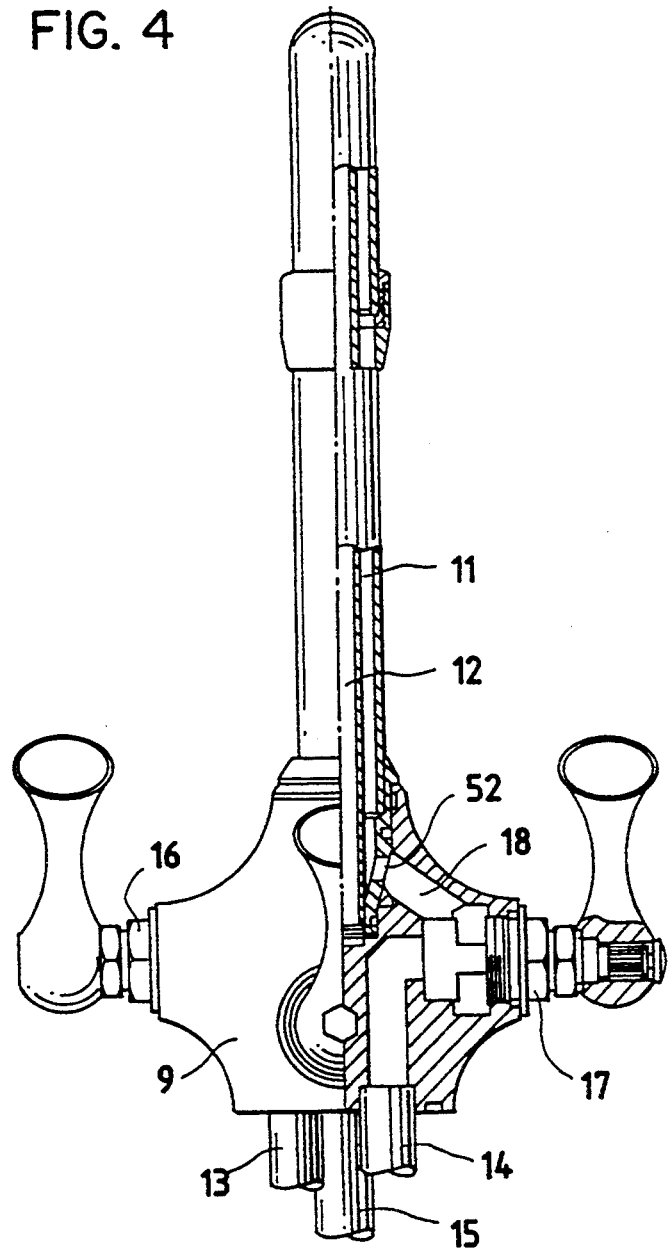
FIG. 4 is a part-sectional front view of the tap of FIG. 3.
Figure 5:
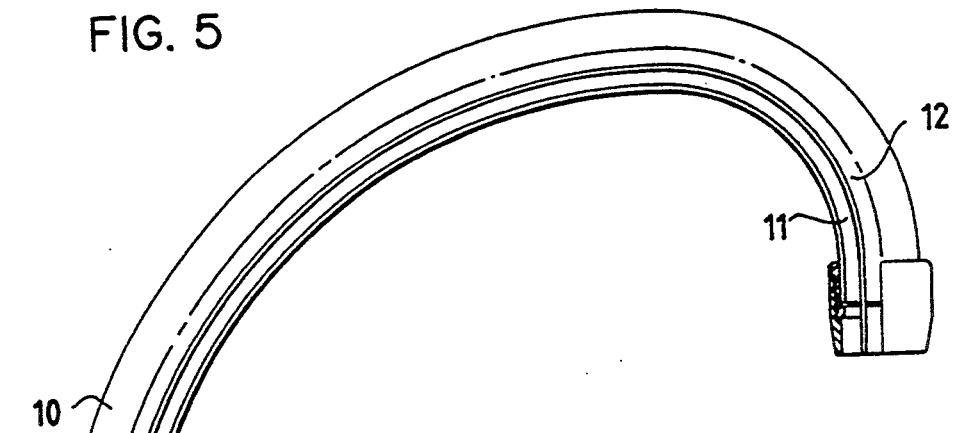
FIG. 5 is an enlarged side view of the tap of FIG. 3.

Referring to FIGS. 1 and 2 of the drawings, a tap body 9 is connected to a U-shaped nozzle 10 of generally conventional type having two water passages 11 and 12 extending the length of the nozzle, passage 11 being defined by a tube which encircles a second tube defining passage 12. The nozzle 10 can swivel in the body 9 as is known in the art.

A hot water connection 13 and a cold water connection 14 are provided for the body as well as a filtered water connection 15. A hot water valve 16 and a cold water valve 17 fit an the body 10 to control the flow of hot and cold water respectively. A peripheral mixing chamber 18 which is formed by a passage way connected to each of the outlets of valves 16 and 17 extends around the outer surface of a lower part of the nozzle 10, inside of the body 9. The hot and cold water will also mix in the outer water passage 11, especially adjacent their direct points of entry into that passage. The nozzle 10 is sealed to the body 9 by a sleeve 50 which carries 'O' ring seals at 51.

The chamber 18 communicates via apertures 52 in the sleeve 50 with the passage 11 so that in use hot or cold water passes along the passage 11 and when both the hot and cold taps are open, mixed hot and cold water is supplied via the passage 11 to the nozzle outlet. Of course, hot and cold water can be supplied singly along the passage 11 if only one valve 16, 17 is opened.

The tube defining passage 12 extends into the tap body through the mixing chamber 18 and is sealed from the mixing chamber by the lower end of the sleeve 50. Passage 12 is connected with the filtered water inlet 15 via a spring-loaded filtered water valve 19, shown particularly In FIG. 2, which is arranged to control the flow of filtered water to the passage 12 of the nozzle 10. The valve 19 is provided with a lever 20 which is pivoted to rotate a valve seal 21a to allow water to flow from inlet 15 to the passage 12 via passageway 22 in the tap body.

The lever 20 may be in the form of a toggle lever which is pivoted away from the tap body and is arranged to remain in its forward most (open) position until manually pressed towards the tap body 9. However in a mid-point position the lever 20 may be arranged to spring back towards the tap body, to close the valve, when released.

As is generally known in the art, the lever 20 may be sprung so as to remain open for a short period when released, before closing automatically.

Preferably the valves 16, 17, 19 are of the type comprising a flat ceramic seat having apertures therethrough. A cooperating valve member 21a is held against the seat 21b and is rotated over the seat to open and close the apertures.

The described mixer tap unit thus provides an arrangement which as a single unit can supply hot or cold water, or mixed hot and cold water, as well as separately a supply of so-called filtered water, that is, purified or treated water which is not supplied, at least directly, from the main water supply. The mixer tap arrangements according to the invention can make use of nozzles which are presently readily available for conventional mixer taps where the hot and cold water are supplied separately in the passages 11 and 12 respectively.

The hot and cold water valves and the purified water valve themselves can also be of generally conventional type so that broadly speaking only the tap body is specially formed to provide outlets for the flow of hot or cold water, or mixed hot and cold water, as well as filtered water. In this way a single mixer tap unit provides the added facility of filtered water and takes up a minimum of space in the kitchen or other points of need.

Some water authority regulations require that the main cold water supply be isolated to prevent contamination. This can be achieved by providing a non-return valve upstream of the valve 17. Preferably, non-return valves are provided upstream of both valves 16, 17.

FIGS. 3 to 6 show a second embodiment of the invention, which is arranged to supply filtered water which can be optionally carbonated. The figures show a tap which of generally the same construction as the tap of the embodiment of FIGS. 1 and 2, like parts being given like reference numerals, but with some modification to the filtered water valve, designated 19', as will be described hereinafter. As before, nozzle 10 includes a passage 12 for the supply of purified water, which is connected to a purified water inlet 15 in the tap body 9 via a valve 19'. The passage 12 is sealed from mixing chamber 18 to prevent mixing with the hot and cold water.

The purified water inlet 15 is connected to a water purifier 23 via a chamber 24. Chamber 24 is also connected to a source of pressurized carbon dioxide gas in the form a $CO_2$ cylinder 25 via a pressurized gas valve 30.

Water purifier 23 is connected to a pressurized cold water supply via a connection 26 and has an outlet 27 connected to an inlet 28 of chamber 24 via a non-return valve 29, and so supplies water under pressure to chamber 24 on demand. The water is fed in through a tube 41 to near the bottom of the chamber 24. Purifier 23 houses replaceable filter cartridges as is known in the art.

Gas is fed into the chamber 24 from cylinder 25 via the valve 30 and a supply pipe 31 which extends through the inlet 28 and tube 41 to the bottom of the chamber 24. An outlet 32 of the chamber 24 is coupled to the tap body inlet 15 via braided copper pipe (not shown).

The valve 19' is operated by a rotatable lever 20. Lever 20 rotates a shaft 33 which carries a cam 34. Cam 34 carries at its center valve member 21a which forms a seal with valve seat 21b mounted fast in the tap body. On its outer surface, the cam 34 has a cam surface 34a which is arranged to depress a spring-biased rod 35 to open the $CO_2$ gas valve 30, as the lever is rotated up to ninety degrees counter-clockwise. This allows $CO_2$ gas to flow into chamber 24 under pressure from the cylinder 25. The gas is fed in to the chamber via the supply pipe 31 and a dispersing nozzle 37 at the bottom of the chamber 24. The non-return valve 29 prevents water from being forced back through the purifier 23 by the gas pressure, and the inlet 15 to the tap body remains closed by the valve 19' when the lever 20' is rotated counter-clockwise, valve member 21a sealing the through aperture(s) ( not shown ) in the valve seat 21b.

The gas supply line to the chamber 24 incorporates an adjustable safety valve 49 which releases gas when the pressure in the chamber 24 and supply line 31 reaches a predetermined amount. The release of gas may be audible to the user.

The gas will readily dissolve in the water and the thus carbonated water rises to the top of the chamber 24, because it is lighter than uncarbonated water. To avoid or reduce leakage past valve 15, the chamber outlet 32 incorporates a gas surge valve 39 which is closed by the immediate build up of pressure in the chamber 24.

Figure 6:
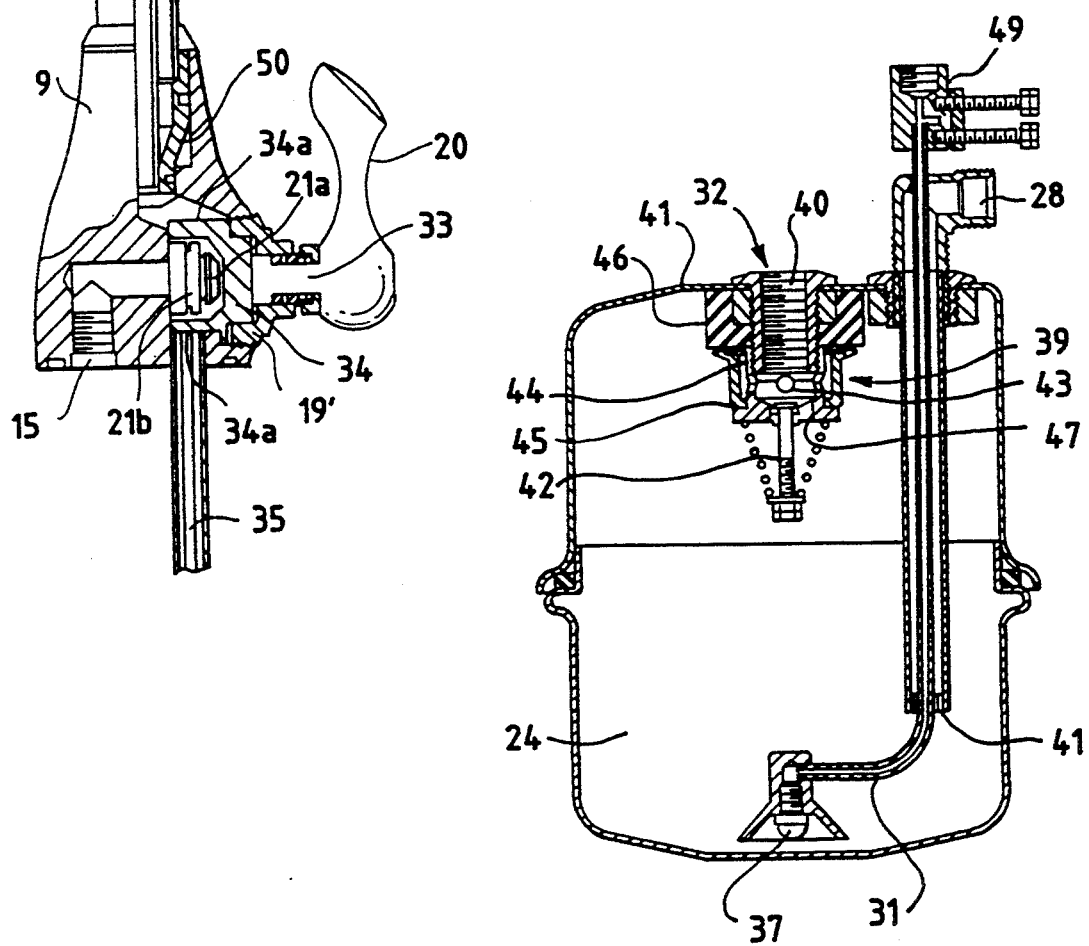
FIG. 6 is an enlarged view of a water chamber of the assembly of FIG. 3.

Referring to FIG. 6, the construction of the gas surge valve 39 in chamber outlet 32 will be described in more detail. An outlet pipe 40 is mounted in an upper wall 51 of the chamber 24. Pipe 40 is closed at its lower end by a pressure release valve 42 and has apertures 43 in its side wall above the pressure release valve 42. A cup shaped valve member 44 is a close fit about the lower end of the pipe 40, and slides between a lower position resting on a flange 45 to allow water to enter pipe 40 through apertures 43, and an upper position where it bears against a rubber seal 46 on the wall 51.

As gas first enters the chamber, the cup shaped member 44 is pushed up against the seal 46 to inhibit flow of water into the outlet pipe 40. As the gas pressure in the chamber 24 increases and the water becomes saturated with dissolved gas, the gas may be heard to seep past valve member 44 an to pipe 40. The user rotates the control lever 20 back to the off position. A bleed aperture 47 equalizes pressure on both sides of the valve member 44 which drops down on to the flange 45. Meanwhile, the user turns the lever 20 clockwise to open the control valve 19 and water is fed from the chamber 24 out through tube 12 under the pressure of water fed in to the system at the filter inlet 26.

Fresh purified water entering chamber 24 via tube 41 displaces the lighter carbonated water without substantial mixing.

The lever 20' is preferably spring loaded to its off (upright) position to prevent wastage of gas or filtered water.

If uncarbonated water is required, lever 20' is simply rotated clockwise to open valve 19', water flowing from the filter 23 through chamber 24. A spring loaded plunger may be housed in the tap body 9 and cooperate with a detent in the rod 33 to hold the lever 20' in the off position.

The arrangement of valve 19', chamber 24, filter 23 and gas supply 25 may be used in a dedicated tap for delivering only filtered water, which is optionally carbonated. Also, it will be appreciated that filter 23 may be omitted if the local water supply is acceptable.

Various modifications may be made to the described embodiment and it is desired to include all such modifications as fall within the scope of the accompanying claims.

We claim:

1. A water tap comprising a tap body, a nozzle coupled to the tap body and having an outlet and at least two separate passages extending from the body to the nozzle outlet, connections for connecting hot and cold water supplies to the body, and a connection for connecting a filtered water supply to the body, and first, second and third control valves on the body controlling respectively the supply of hot and cold water and filtered water to the nozzle passages via the body, the arrangement being such that the filtered water passes through one of the nozzle passages and the hot and cold water pass through the other passage or passages.

2. A tap as claimed in claim 1, wherein the filtered water control valve is biased to a closed position.

3. A tap as claimed in claim 1, wherein the tap body includes a mixing chamber into which the hot and cold water are fed from the respective control valves.

4. A tap as claimed in claim 3, including non-return valves upstream of the hot and cold water-control valves.

5. A tap as claimed in claim 1, including a fourth control valve and water supply connection for a supply of carbonated water.

6. An assembly comprising a tap as claimed in claim 1 and means for carbonating said filtered water.

7. An assembly as claimed in claim 6, wherein the carbonated filtered water is supplied via the filtered water supply connection.

8. An assembly as claimed in claim 6, wherein the filtered water control valve is arranged to operate selectively the means for carbonating filtered water before it is delivered to the nozzle.

9. An assembly as claimed in claim 6, said means for carbonating said filtered water comprising a temporary water storage chamber, having an inlet and an outlet, connected between the filtered water supply and the filtered water supply connection, a gas supply comprising a source of pressurized carbon dioxide gas connected to the storage chamber, and means for selectively injecting the carbon dioxide gas into water held in the storage chamber.

10. An assembly as claimed in claim 9, said means for selectively injecting the carbon dioxide gas comprising a gas control valve connected between the gas supply and the storage chamber the gas control valve being operated by the filtered water control valve, and a pressure release valve for releasing gas from the chamber when the pressure therein exceeds a predetermined amount.

11. An assembly as claimed in claim 10, including a gas pressure surge valve at the storage chamber outlet which is closed as gas pressure in the chamber increases and open when the pressure has stabilized.

12. A water tap comprising a tap body, a nozzle coupled to the tap body and having an outlet and at least two separate passages extending from the body to the nozzle outlet, connections for connecting hot and cold water supplies to the body, and a connection for connecting a filtered water supply to the body, and control valve means on the body for controlling the supply of hot and cold water and filtered water to the nozzle passages via the body, the arrangement being such that the filtered water passes through one of the nozzle passages and the hot and cold water pass through the other passage or passages.

* * * * *